United States Patent
Strock

[15] 3,691,987
[45] Sept. 19, 1972

[54] INDICATOR MECHANISM FOR NAVIGATION INSTRUMENTS

[72] Inventor: Richard R. Strock, Phoenix, Ariz.
[73] Assignee: Sperry Rand Corporation
[22] Filed: Jan. 14, 1971
[21] Appl. No.: 106,466

[52] U.S. Cl. ..........................116/129 R, 73/178 R
[51] Int. Cl. ............................................G01c 23/00
[58] Field of Search...116/129; 73/178 R, 178 T, 178 H; 340/27 AT, 27 NA

[56] References Cited

UNITED STATES PATENTS 3,094,971  6/1963  Guarino et al. ........116/129 R

Primary Examiner—Donald O. Woodiel
Attorney—S. C. Yeaton

[57] ABSTRACT

An indicator mechanism for navigational instruments comprising first and second members mounted for rotation with respect to each other and with respect to the instrument housing. Drive means are included for rotating the first and second members at the same angular velocity with respect to each other relative to the housing in response to a roll signal and for rotating one of the members with respect to the other in response to a pitch signal. An indicator is coupled to the first and second members so that a first motion is imparted thereto about the roll axis of the instrument when the first and second members rotate at the same angular velocity and a second motion is imparted thereto about the pitch axis of the instrument when one of the members rotates with respect to the other.

18 Claims, 5 Drawing Figures

INVENTOR
RICHARD R. STROCK
BY
H. P. Terry
ATTORNEY

INVENTOR
RICHARD R. STROCK
BY
ATTORNEY

INDICATOR MECHANISM FOR NAVIGATION INSTRUMENTS

BACKGROUND OF THE INVENTION

1. Field of the Invention

The invention pertains to indicating instruments, particularly of the aircraft flight director type.

2. Description of the Prior Art

Aircraft flight director instruments are known that provide visual commands to the pilot indicating the control required to bring the craft to a predetermined flight path or attitude. A flight director instrument commonly utilized is the cross-pointer indicator of the type shown and described in U.S. Pat. No. 2,613,352, "Radio Navigation System", by S. Kellogg, second, issued on Oct. 7, 1952, and assigned to the assignee of the present application.

The cross-pointer indicator conventionally provides visual roll commands by means of a vertically oriented pointer and visual pitch commands by means of a horizontally disposed pointer. The drive mechanisms for the pointers may comprise conventional meter movements that receive pitch and roll command signals from the flight director system, the signals being derived from the aircraft navigational equipment such as the instrument landing system (ILS) and very high frequency omnirange (VOR) receivers and the aircraft gyros. The cross-pointer indicator provides visual roll and pitch commands to the pilot, derived from the aircraft navigational equipment, in accordance with the mode in which the flight director system is operating. For example, on a conventional instrument landing approach, it is desirable to control the aircraft altitude in accordance with an ILS glide slope signal and simultaneously to control the craft heading in accordance with an ILS localizer signal. The visual altitude commands are usually provided via the flight director pitch channel by vertical displacements of the horizontal pointer of the cross-pointer indicator, the heading commands being provided via the roll channel by horizontal displacements of the vertical pointer. The various operational modes of a flight director system utilizing a cross-pointer indicator are fully discussed in said U.S. Pat. No. 2,613,352.

It is considered desirable to incorporate a flight director indicator into an attitude indicating instrument preferably of the attitude-sphere type. Such a combined instrument and the advantages thereof are fully discussed in U.S. Pat. No. 2,821,695 "Aircraft Navigation Instrument", by R. R. Strock et al. issued on Jan. 28, 1958, and assigned to the assignee of the present application. It will be appreciated that to conveniently include flight director indicators in an attitude sphere instrument, the indicators should preferably execute circular motions of the meter movement type for convenience in the placement of the pointer drive mechanisms and for simplicity thereof as well as for minimizing the instrument outer dimensions hence facilitating mounting in the aircraft.

As previously discussed, visual roll and pitch commands are often provided to the pilot by means of the two pointers, respectively, of a cross-pointer indicator. It may be desirable, in accordance with pilot preference, to provide the pitch and roll commands by means of a single indicator element that may superimpose the separate pitch and roll motions usually provided by the individual pointers. A prior art flight director indicator of the single element type may provide roll and pitch commands utilizing a single indicator that is, in fact, comprised of two indicator bars. The end of one bar is disposed adjacent the end of the other bar generally near the center of the instrument face. The indicator bars are individually pivotally mounted so as to execute a motion from a horizontally aligned disposition to an inverted V configuration to provide the required range of pitch commands. The mounting and drive mechanism of the indicator is arranged to rotate both bars about the roll axis of the instrument while maintaining the pitch orientation thereof fixed to provide the required roll commands. This prior art device has the disadvantage of requiring two support arms for the two bars, respectively, of the indicator, hence limiting the packaging arrangements thereof within the flight director instrument. The drive mechanism for such a prior art indicator is necessarily complex in order to execute the complicated pitch and roll command motions required. Hence, the instrument may be costly to manufacture as well as requiring excessive volume and weight. In addition, the command motions of the indicator bars are coplanar, thereby rendering the inclusion of the indicator in an instrument of the attitude-sphere type unduly inconvenient. Additionally, the pitch command motions described are not suggestive of the pitch control required of the pilot as is desirable in instruments of this type. It may furthermore be inconvenient in certain applications to utilize a two-bar indicating element as required by this prior art design.

An alternative prior art arrangement of a single element indicator may be realized by incorporating a platform in the instrument, the platform being mounted for rotation about the roll axis thereof. A meter movement or a servo mechanism mounted on the platform provides pitch motions to an indicator element that is connected thereto. It is thus appreciated that visual roll commands are provided by rotating the platform, hence imparting roll motions to the indicator element. Energization of the meter movement or servo mechanism mounted on the platform imparts the required pitch motions to the indicator. This prior art arrangement requires a large swing circle for the platform as well as a counterweight for the meter movement or servo mechanism thereby increasing the dimensions required to house the instrument. In addition, slip rings or flex leads are required to provide the energizing signals to the platform mounted meter movement or servo mechanism, which arrangement has disadvantages well known to those skilled in the art.

SUMMARY OF THE INVENTION

The present invention provides a device that imparts meter movement type pitch and roll motions to a single indicating element by means of a relatively simple mechanism. The indicator of the present invention is therefore inexpensive to manufacture, light weight and of small volume relative to the prior art arrangements described above. In addition, since the pitch and roll command motions executed by the indicator of the present invention are of the circular meter movement type, the incorporation thereof into an attitude-sphere type of instrument is facilitated. Additionally, the drive servo mechanisms may be mounted with respect to the instrument housing hence eliminating the disadvantages discussed above with respect to the rotating platform instrumentation. Therefore, the novel features of the present invention permit the utilization of a single indicating element that executes pitch and roll command motions that are realistically suggestive of the aircraft control required of the pilot in response to the visual commands.

The present invention comprises first and second members mounted for rotation with respect to each other and with respect to the instrument housing. Drive means are included for rotating the first and second members at the same angular velocity with respect to each other relative to the housing in response to a roll signal and for rotating one of the members with respect to the other in response to a pitch signal. An indicator is coupled to the first and second members so that a first motion is imparted thereto about the roll axis of the instrument when the first and second members rotate at the same angular velocity and a second motion is imparted thereto about the pitch axis of the instrument when one of the members rotates with respect to the other.

DESCRIPTION OF THE PREFERRED EMBODIMENTS

Figure 1:
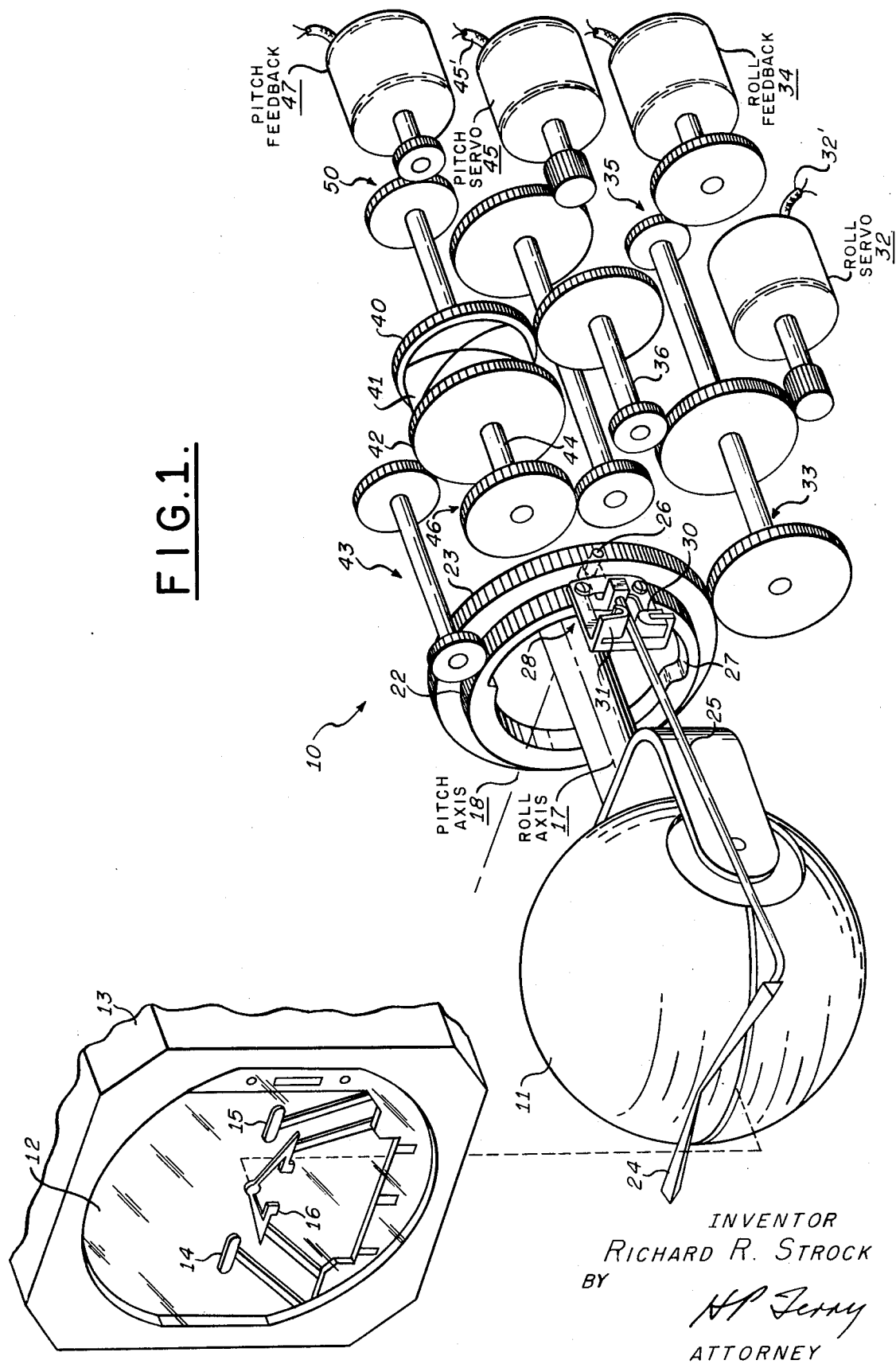
FIG. 1 is a schematic perspective view, partially in section, of a preferred embodiment of the invention.
Figure 3:
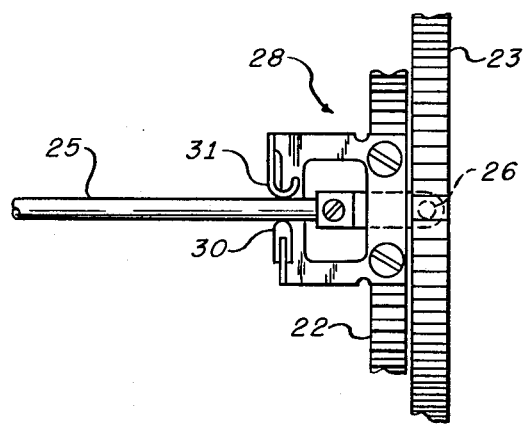
FIG. 3 is a detailed side elevation view of the coupling mechanism of the embodiment of FIG. 1.
Figure 4:
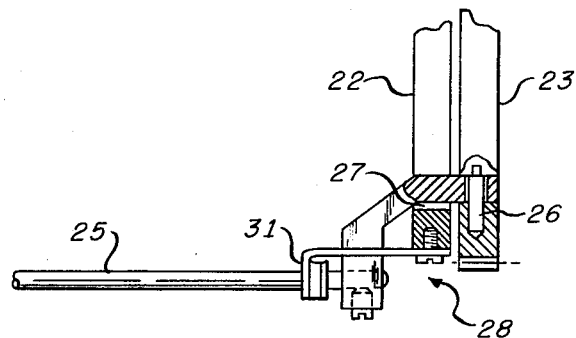
FIG. 4 is a detailed plan view partially in section of the coupling mechanism of FIG. 3.

Referring to FIGS. 1, 3 and 4, in which like reference numerals designate like elements with respect to each other, an attitude indicating instrument 10 of the sphere type incorporating a preferred embodiment of the indicator of the present invention, is illustrated. The instrument 10 includes an attitude indicating member for example, an attitude-sphere 11, a transparent faceplate 12 and a housing 13 in the manner described in said U.S. Pat. No. 2,821,695. Indices 14 and 15, fixed to the housing 13 and viewable through the faceplate 12, are used for reference purposes with respect to the attitude-sphere 11. An index 16, fixed to the housing 13 and disposed for view near the center of the instrument face, is used for reference purposes with respect to the indicator of the present invention in a manner to be explained.

A longitudinal axis 17 of the instrument 10 is preferably disposed parallel to the roll axis of the aircraft and will be referred to as the roll axis of the instrument. A lateral axis 18, perpendicular to the axis 17, is preferably normally disposed parallel to the horizon and will be referred to as the pitch axis of the instrument.

The indicator mechanism of the present invention includes an annular ring gear 22 mounted for rotation about the axis 17 and a similarly mounted annular ring gear 23. The ring gears 22 and 23 are mounted for rotation with respect to the housing 13 by means of peripherally disposed rollers, which are not shown for clarity, in the manner described in U.S. Pat. No. 2,932,024, "Aircraft Navigation Instrument", by M.A. Sant Angelo, issued on Apr. 5, 1960, and assigned to the assignee of the present application.

The indicator mechanism of the present invention includes an indicating element 24 disposed for view through the faceplate 12. The indicating element 24 is connected to one end of a support arm 25, the other end of which has a pivot pin 26 connected thereto. The pivot pin 26 is journaled in the ring gear 23 for pivotal coupling therewith. The support arm 25 is slidably coupled to the ring gear 22 in a clearance cutout 27. A member 30 connected to the ring gear 22 provides sliding bearing support for the arm 25 and a spring member 31, connected to the ring gear 22, maintains the arm 25 in bearing contact therewith.

The pivot pin 26 journaled in the ring gear 23 and the slidable link connecting the arm 25 to the ring gear 22, form a coupling means 28 that imparts motions representative of roll and pitch to the indicating element 24 in a manner to be explained. These motions will hereinafter be referred to as roll and pitch motions of the indicating element for convenience.

While the coupling means 28 has been described in terms of the pivot pin 26 journaled in the ring gear 23 and the slidable link coupling the arm 25 to the ring gear 22, which link has in turn been illustrated in terms of the bearing member 30 and the spring 31, it will be understood by those skilled in the art that any conventional pivotal coupling and slidable coupling, respectively, may be resorted to without departing from the spirit and scope of the invention.

A roll motor 32 is adapted to be responsive via leads 32' to the roll command signals, for example, from the flight director system of which the instrument 10 is a component part. The motor 32 is coupled to the ring gear 23 by suitable gearing 33 and to a roll position feedback device 34 through suitable gearing 35. The roll motor 32 and the feedback device 34 may be utilized to form a conventional closed-loop roll positioning servo responsive to the flight director roll command signal for imparting roll motions to the indicating element 24 in a manner to be described.

The roll motor 32 is also coupled, through suitable gearing 36, to one end gear 40 of a differential 41. The other end gear 42 of the differential 41 is coupled through suitable gearing 43 to the ring gear 22. It will be appreciated, for reasons to be explained, that the relative gear ratios of the gearing 22, 23, 33, 36, 40, 41, 42 and 43 may be chosen so that the ring gears 22 and 23 rotate together at the same angular velocity relative to each other when the roll motor 32 is energized and the input shaft 44 of the differential 41 is held stationary.

A pitch motor 45 is adapted to be responsive via leads 45' to the pitch command signals, for example, from the flight director system of which the instrument 10 is a component part. The motor 45 is coupled to the input shaft 44 of the differential 41 through suitable gearing 46. When the roll motor 32 is not energized, the gearing 33 holds the ring gear 23 stationary with respect to the housing 13 and similarly holds the end gear 40 of the differential 41 stationary via the gearing 36. Under these conditions, energization of the pitch motor 45 causes the ring gear 22 to rotate with respect to the ring gear 23 via the gearing 46, the input shaft 44 of the differential 41, the differential end gear 42 and the gearing 43 for reasons to be discussed.

The input shaft 44 of the differential 41 is also coupled to a pitch position feedback device 47 through suitable gearing 50. The pitch motor 45 and the feedback device 47 may be utilized to form a conventional closed-loop pitch positioning servo responsive to the flight director pitch command signal for imparting pitch motions to the indicating element 24 in a manner to be described.

The operation of the indicator mechanism illustrated in FIGS. 1, 3 and 4, will be explained first in terms of a roll command in the absence of a pitch command. In the absence of a pitch command signal from the flight director system, the pitch motor 45 is maintained stationary thereby holding stationary the input shaft 44 of the differential 41 via the gearing 46. The roll command signal from the flight director system energizes the roll motor 32 causing the ring gears 22 and 23 to rotate together about the axis 17 as previously explained. The coupling 28 thus causes the indicating element 24 to roll about the axis 17 by means of the connecting arm 25 as required.

The operation of the indicator mechanism illustrated in FIGS. 1, 3 and 4 will be explained now in terms of a pitch command in the absence of a roll command. In the absence of a roll command signal from the flight director system, the roll motor 32 is maintained stationary thereby holding stationary the ring gear 23 and the end gear 40 via the gearing 33 and 36 respectively. The pitch command signal from the flight director system energizes the pitch motor 45 causing the ring gear 22 to rotate relative to the ring gear 23 as previously explained. Thus since the pivot pin 26 journaled in the ring gear 23 is maintained stationary and the slidable link coupling the arm 25 to the ring gear 22 imparts a lateral motion thereto, the arm 25 and hence the indicating element 24 execute pitch motions about the axis 18 as required.

It is now appreciated that the indicating element 24 is caused to execute combined motions related to the roll and pitch command signals from the flight director system which motions are superpositions of the separate roll and pitch motions previously described.

It is further appreciated that the respective pivotal and slidable connections of the coupling 28 to the ring gears 23 and 22 may be interchanged with respect to the gears to the same effect. With this arrangement, the ring gear 22 would be maintained stationary during pitch command motions by simple changes to the gearing coupling the motors 32 and 45 to the ring gears 22 and 23.

Figure 2:
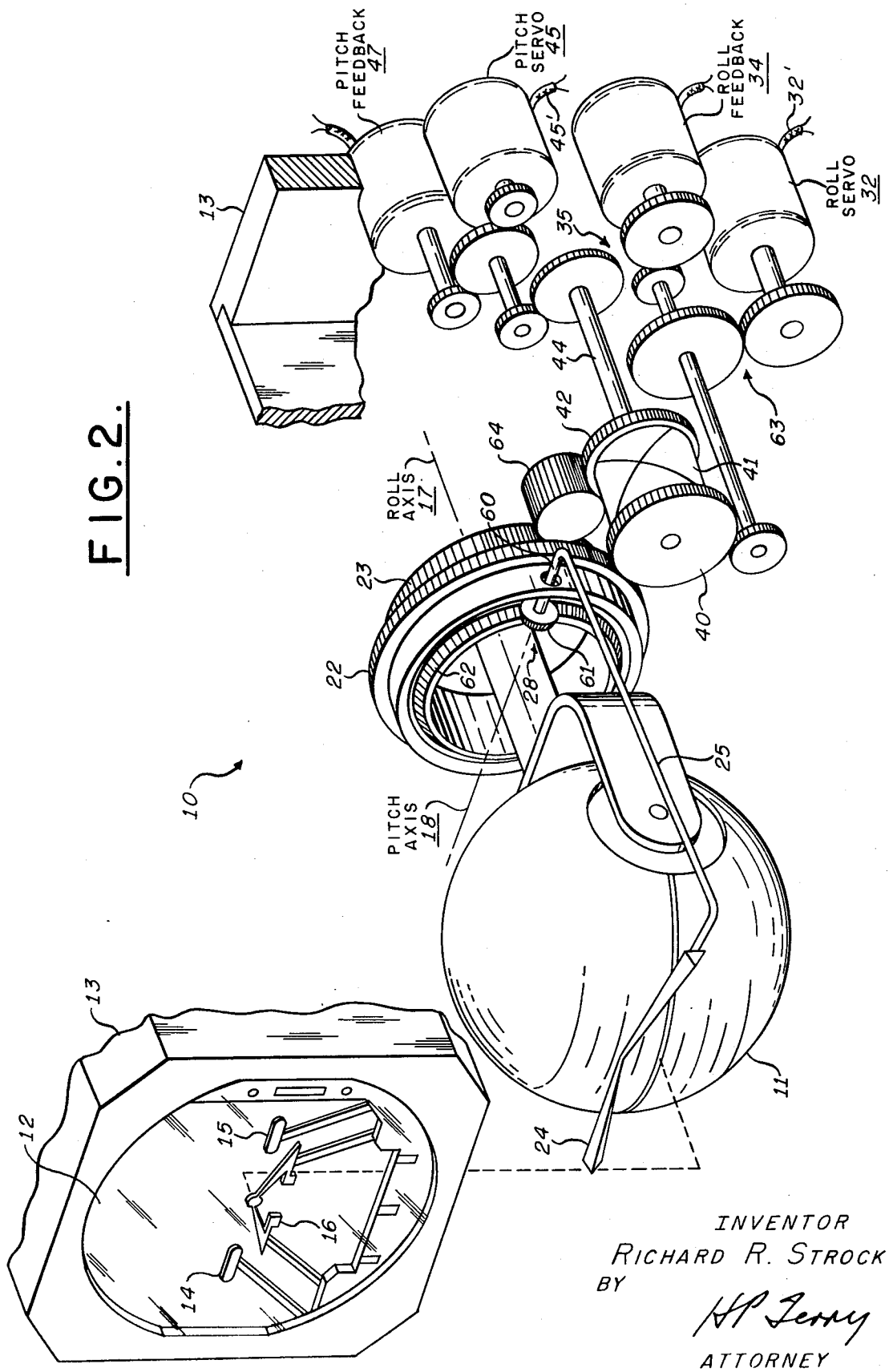
FIG. 2 is a schematic perspective view, partially in section, of another preferred embodiment of the invention.
Figure 5:
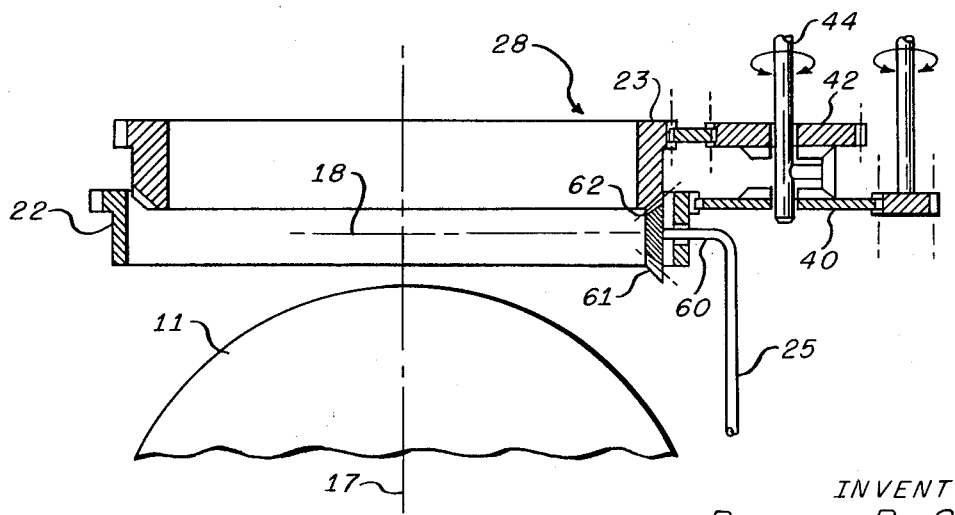
FIG. 5 is a detailed plan schematic view partially in section of the coupling mechanism of the embodiment of FIG. 2.

Referring now to FIGS. 2 and 5, in which like reference numerals indicate like components with respect to FIGS. 1, 3 and 4, another preferred embodiment of the indicator mechanism of the present invention is illustrated. The mechanism of FIGS. 2 and 5 is similar to that previously described with respect to FIGS. 1, 3 and 4, with the exception of the coupling 28 and the gearing connecting the motors 32 and 45 to the ring gears 22 and 23.

In the embodiment of FIGS. 2 and 5, the arm 25 has a bend at the end thereof opposite the indicating element 24 forming a leg 60. The leg 60 is journaled through the ring gear 22 for rotation about the pitch axis 18. A bevel gear 61 connected to the end of the leg 60 is arranged to mesh with a bevel gear 62 formed as part of the ring gear 23. Hence, in this embodiment of the invention, the coupling means 28 is comprised of the journaled bearing of the leg 60 in the ring gear 22 and the bevel gears 61 and 62.

While the coupling means 28 has been illustrated and described in terms of bevel gears 61 and 62, it will be understood by those skilled in the art that a face gear and pinion combination, belt driven pulleys and the like may be resorted to without departing from the spirit and scope of the invention.

The gearing coupling the motors 32 and 45 to the ring gears 22 and 23 comprises a conventional re-arrangement of the gearing described with respect to FIG. 1 so that the ring gear 22 is maintained stationary during pitch motions of the indicating element 24 rather than the ring gear 23 as previously described. In this embodiment, the roll motor 32 is coupled to the end gear 40 of the differential 41 through suitable gearing 63. The end gear 40 is in turn coupled to the ring gear 22 and the end gear 42 of the differential 41 is coupled to the ring gear 23 via an idler gear 64.

The operation in roll of the indicator mechanism illustrated in FIGS. 2 and 5 is similar to that previously described with respect to FIGS. 1, 3 and 4. When the roll motor 32 is energized in the absence of a pitch command signal, the input shaft 44 of the differential 41 is maintained stationary. The energized roll motor 32 transmits rotation to the ring gear 22 via the gearing 63 and the end gear 40 of the differential 41. Since the end gear 40 is rotated by the roll motor 32 and the input shaft 44 of the differential 41 is maintained stationary, the end gear 42 rotates in a direction opposite to that of the gear 40. The idler gear 64 transmits the motion of the gear 42 to the ring gear 23 so as to cause it to rotate in the same direction as the ring gear 22. The relative gear ratios of the gearing is chosen so that the ring gears 22 and 23 rotate at the same angular velocity with respect to each other when the roll motor 32 is energized in the absence of a pitch command signal. Hence the required roll motion is imparted to the indicating element 24 about the axis 17 in a manner similar to that previously described with respect to FIGS. 1, 3 and 4.

The pitch operation of the embodiment of the invention illustrated in FIGS. 2 and 5 is similar to that described with respect to FIGS. 1, 3 and 4. When the pitch motor 45 is energized in the absence of a roll command, the ring gear 22 is maintained stationary via the end gear 40 of the differential 41. The energized pitch motor 45 transmits rotation to the ring gear 23 via the input shaft 44 of the differential 41, the end gear 42 thereof and the idler gear 64. Thus when the ring gear 23 rotates with respect to the ring gear 22, the leg 60 is rotated about the pitch axis 18 by the bevel gears 61 and 62 imparting the required pitch motion to the indicating element 24 about the axis 18 in a manner similar to that previously described with respect to FIGS. 1, 3 and 4.

It will be appreciated that the functions of the ring gears 22 and 23 may be interchanged with respect to the coupling 28 in the manner previously described with respect to FIGS. 1, 3 and 4.

It is now appreciated that the embodiment of FIGS. 1, 3 and 4 is particularly suited to indicators where smooth pitch motion of the indicating element is required. The leverage provided by the bearing member 30 and the spring member 31 with respect to the pivot pin 26 provides the smooth pitch motion as required.

It will further be appreciated that the embodiment illustrated in FIGS. 2 and 5 may be utilized where linear pitch motion is required over a relatively extended range. The bevel gears 61 and 62 provide this linear motion.

It is further appreciated that the indicator mechanism of the present invention may be utilized in a flight director mode of operation wherein the pilot controls the aircraft so that the indicating element 24 is maintained aligned with the reference index 16.

It is still further appreciated that the drive mechanism comprised of the roll and pitch motors, the feedback devices and the gearing to the indicator mechanism as illustrated and described above is typical and may be modified by those skilled in the art depending upon the specific components utilized. Additionally, the shape of the indicating element 24 and the reference index 16 are illustrative only and may be varied to suit the instrument in which they are utilized.

It is now appreciated that the motions imparted to the indicating element 24 are compatible with the motions executed by meter movement driven indicators and thus the indicator mechanism of the present invention is adaptable for inclusion in the wide variety of flight instruments configured for display motions of this type.

It will now be appreciated that the present invention incorporates a simple mechanism, compared to the prior art devices, previously discussed, for imparting roll and pitch motions to a single indicating element, which motions are realistically suggestive of the control required of the pilot of the aircraft. Since the present invention only requires a single indicating element, a single support arm may be utilized thus providing greater latitude in the packaging arrangements of the instrument. Since only a single indicating element is required in the present invention, a less cluttered instrument face may be provided compared to the prior art discussed above where the indicating element must be in two parts.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. In an indicating instrument responsive to first and second signals and having an attitude indicating member and a housing,
   first and second rotatable means mounted for rotation with respect to each other and with respect to said housing and disposed in back of said attitude indicating member,
   drive means for rotating said first and second rotatable means at the same angular velocity with respect to each other relative to said housing in response to said first signal and for rotating one of said rotatable means with respect to the other of said rotatable means in response to said second signal,
   arm means,
   an indicating element connected at one end of said arm means and disposed in front of said attitude indicating member, and
   coupling means for connecting the other end of said arm means to said first and second rotatable means and so constructed and arranged that a first motion is imparted to said indicating element about a first axis when said first and second rotatable means rotate at said same angular velocity and a second motion is imparted to said indicating element about a second axis transverse to said first axis when one of said rotatable means rotates with respect to the other of said rotatable means.

2. In an indicating instrument responsive to first and second signals and having a housing
   first and second rotatable means mounted for rotation with respect to each other and with respect to said housing,
   drive means for rotating said first and second rotatable means at the same angular velocity with respect to each other relative to said housing in response to said first signal and for rotating one of said rotatable means with respect to the other of said rotatable means in response to said second signal,
   indicator means coupled to said first and second rotatable means and so constructed and arranged therewith that a first motion is imparted thereto about a first axis when said first and second rotatable means rotate at said same angular velocity and a second motion is imparted thereto about a second axis transverse to said first axis when one of said rotatable means rotates with respect to the other of said rotatable means,
   said indicator means comprising arm means and an indicating element connected at one end thereof, and
   coupling means for connecting the other end of said arm means to said first and second rotatable means,
   said coupling means comprising first connecting means for pivotally connecting said other end of said arm means to one of said rotatable means and second connecting means for slidably coupling said arm means to the other of said rotatable means.

3. In the instrument of claim 2 in which said first connecting means comprises pivot pin means connected to said other end of said arm means and journaled in said one rotatable means.

4. In the instrument of claim 2 in which said second connecting means comprises means connected to said other rotatable means for providing sliding bearing support for said arm means, and spring means connected to said other rotatable means for urging said arm means into contact with said bearing means.

5. In the instrument of claim 2 in which said drive means includes means for rotating said other rotatable means with respect to said one rotatable means, said one rotatable means being maintained stationary with respect to said housing, in response to said second signal.

6. In the instrument of claim 1 in which
said first and second axes are disposed orthogonally with respect to each other, and
said first and second rotatable means have axes of rotation coaxially disposed with respect to each other and parallel to said first axis.

7. In the instrument of claim 1 in which said first and second rotatable means comprise first and second annular members respectively.

8. In the instrument of claim 1 in which said coupling means comprises
first connecting means for rotatably connecting said other end of said arm means to one of said rotatable means, and
second connecting means for coupling said other end of said arm means to the other of said rotatable means for imparting rotation to said other end of said arm means about said second axis when said other rotatable means rotates with respect to said one rotatable means.

9. In the instrument of claim 8 in which said first connecting means comprises
journal bearing means in said one rotatable means, and
journal means disposed at said other end of said arm means,
said journal means being journaled in said journal bearing means.

10. In the instrument of claim 9 in which
said other rotatable means includes first gear means, and
said second connecting means comprises second gear means connected to said journal means and meshed with said first gear means thereby imparting rotation to said journal means about the axis of said journal bearing means when said other rotatable means rotates with respect to said one rotatable means.

11. In the instrument of claim 8 in which said drive means includes means for rotating said other rotatable means with respect to said one rotatable means, said one rotatable means being maintained stationary with respect to said housing, in response to said second signal.

12. In the instrument of claim 1 in which said drive means comprises
first motor means fixed to said housing for rotating said first and second rotatable means at said same angular velocity in response to said first signal, and
second motor means fixed to said housing for rotating one of said rotatable means with respect to the other of said rotatable means in response to said second signal.

13. In an indicating instrument for aircraft responsive to roll and pitch command signals and having an attitude indicating member and a housing,
first and second rotatable means mounted for rotation with respect to each other and with respect to said housing and disposed in back of said attitude indicating member;
drive means for rotating said first and second rotatable means at the same angular velocity with respect to each other relative to said housing in response to said roll command signal and for rotating one of said rotatable means with respect to the other of said rotatable means in response to said pitch command signal,
arm means,
an indicating element connected at one end of said arm means and disposed in front of said attitude indicating member, and
coupling means for connecting the other end of said arm means to said first and second rotatable means and so constructed and arranged that a first motion is imparted to said indicating element about the roll axis of said instrument when said first and second rotatable means rotate at said same angular velocity and a second motion is imparted to said indicating element about the pitch axis of said instrument when one of said rotatable means rotates with respect to the other of said rotatable means.

14. In an indicating instrument for aircraft responsive to roll and pitch command signals and having a housing,
first and second rotatable means mounted for rotation with respect to each other and with respect to said housing,
drive means for rotating said first and second rotatable means at the same angular velocity with respect to each other relative to said housing in response to said roll command signal and for rotating one of said rotatable means with respect to the other of said rotatable means in response to said pitch command signal,
indicator means coupled to said first and second rotatable means and so constructed and arranged therewith that a first motion is imparted thereto about the roll axis of said instrument when said first and second rotatable means rotate at said same angular velocity and a second motion is imparted thereto about the pitch axis of said instrument when one of said rotatable means rotates with respect to the other of said rotatable means,
said indicator means comprising arm means and an indicating element connected at one end thereof, and
coupling means for connecting the other end of said arm means to said first and second rotatable means,
said coupling means comprising first connecting means for pivotally connecting said other end of said arm means to one of said rotatable means and second connecting means for slidably coupling said arm means to the other of said rotatable means.

15. In the instrument of claim 14 in which said first connecting means comprises pivot pin means connected to said other end of said arm means and journaled in said one rotatable means.

16. In the instrument of claim 15 in which said second connecting means comprises
- means connected to said other rotatable means for providing sliding bearing support for said arm means, and
- spring means connected to said other rotatable means for urging said arm means into contact with said bearing means.

17. In the instrument of claim 16 in which said drive means comprises
- roll motor means fixed to said housing for rotating said first and second rotatable means at said same angular velocity in response to said roll command signal, and
- pitch motor means fixed to said housing for rotating said other rotatable means with respect to said one rotatable means, said one rotatable means being maintained stationary with respect to said housing, in response to said pitch command signal.

18. In the instrument of claim 17 in which said first and second rotatable means comprise first and second annular members respectively, coaxially mounted relative to each other, the axis of rotation thereof being parallel to said roll axis.

* * * * *